United States Patent
Sherman et al.

(10) Patent No.: US 12,141,822 B1
(45) Date of Patent: Nov. 12, 2024

(54) SYSTEM AND METHOD TO EXTRAPOLATE INVENTORY SALES DATA USING INCOMPLETE MARKET DATA

(71) Applicant: BROKER GENIUS, INC., Far Rockaway, NY (US)

(72) Inventors: Shmuel Sherman, Valley Stream, NY (US); Yiren Li, New York, NY (US)

(73) Assignee: BROKER GENIUS INC., Far Rockaway, NY (US)

( * ) Notice: Subject to any disclaimer, the term of this patent is extended or adjusted under 35 U.S.C. 154(b) by 138 days.

(21) Appl. No.: 16/939,806

(22) Filed: Jul. 27, 2020

Related U.S. Application Data

(60) Provisional application No. 62/878,930, filed on Jul. 26, 2019.

(51) Int. Cl.
*G06Q 30/0201* (2023.01)
*G06Q 10/087* (2023.01)

(52) U.S. Cl.
CPC ....... *G06Q 30/0201* (2013.01); *G06Q 10/087* (2013.01)

(58) Field of Classification Search
None
See application file for complete search history.

(56) References Cited

U.S. PATENT DOCUMENTS

| | | | | |
|---|---|---|---|---|
| 11,222,026 B1* | 1/2022 | Arya | ................. | G06F 16/24534 |
| 2007/0038582 A1* | 2/2007 | Brett | ................. | H04L 12/1809 |
| | | | | 705/65 |
| 2008/0133456 A1* | 6/2008 | Richards | ............. | G06F 16/2455 |
| 2008/0162211 A1* | 7/2008 | Addington | ............. | G06Q 40/04 |
| | | | | 705/14.5 |
| 2010/0114663 A1* | 5/2010 | Casas | ................. | G06Q 30/0202 |
| | | | | 705/7.31 |
| 2013/0185103 A1* | 7/2013 | Sunshine | ........... | G06Q 30/0601 |
| | | | | 705/5 |
| 2014/0019511 A1* | 1/2014 | Fradkov | ................. | G06Q 20/10 |
| | | | | 709/201 |
| 2015/0025918 A1* | 1/2015 | Sherman | ........... | G06Q 30/0206 |
| | | | | 705/5 |

(Continued)

FOREIGN PATENT DOCUMENTS

| WO | WO-2006035233 A1 * | 4/2006 | ............. | G06Q 10/06 |
|---|---|---|---|---|
| WO | WO-2015087026 A1 * | 6/2015 | ............. | G06Q 10/02 |

OTHER PUBLICATIONS

Phumchusri, Dynamic Pricing in Performance Theater Industry: An Empirical Study (Year: 2013).*

(Continued)

*Primary Examiner* — Mohamed N El-Bathy
(74) *Attorney, Agent, or Firm* — Leason Ellis LLP

(57) ABSTRACT

A method and apparatus for estimating sales across a market with incomplete information taken from one or a plurality of exchanges, is disclosed. Inventory is observed disappearing from the exchanges. There is some probability that the inventory disappeared because it was sold, and some probability that it was withdrawn by the broker for a variety of other reasons. Disappeared inventory is assigned a score that correlates with the likelihood of the listing having been sold. A list of these inferred sales is generated by comparing the score to a threshold. A further refinement removes items from the list should the sold inventory return to the market.

11 Claims, 4 Drawing Sheets

(56) References Cited

U.S. PATENT DOCUMENTS

| | | | | |
|---|---|---|---|---|
| 2016/0026972 | A1* | 1/2016 | Bhalodwala | G06Q 40/12 |
| | | | | 705/28 |
| 2016/0125433 | A1* | 5/2016 | Villars | G06F 16/2477 |
| | | | | 705/7.31 |
| 2016/0292751 | A1* | 10/2016 | Hartman | G06Q 30/0283 |
| 2016/0350732 | A1* | 12/2016 | Hansen | G06Q 50/188 |
| 2017/0116549 | A1* | 4/2017 | Sunshine | G06Q 10/04 |
| 2019/0213621 | A1* | 7/2019 | Groetzinger | G06Q 30/0207 |
| 2020/0273055 | A1* | 8/2020 | Smith | G06Q 10/02 |

OTHER PUBLICATIONS

Gupta et al., Dynamic Pricing in Movie Tickets using Regression Techniques (Year: 2018).*

Abernathy et al., Data Science in Service of Performing Arts: Applying Machine Learning to Predicting Audience Preferences (Year: 2016).*

Maheswari et al., Predicting customer behavior in online shopping using SVM classifier (Year: 2017).*

* cited by examiner

SYSTEM AND METHOD TO EXTRAPOLATE INVENTORY SALES DATA USING INCOMPLETE MARKET DATA

CROSS-REFERENCE TO PRIOR APPLICATION

This application claim priority to U.S. Provisional Application No. 62/878,930, filed on Jul. 26, 2019, and herein incorporated by reference as if presented in its respective entirety.

FIELD OF INVENTION

The present invention relates generally to the field of pricing inventory, and specifically to competitively pricing inventory in a fragmented market with imperfect transactional data.

BACKGROUND OF THE INVENTION

Event ticketing sales is a roughly USD$60B market in the US and is largely fragmented among a handful of consumer facing sites referred to as exchanges. Most ticket inventory is available initially on a single site on the so-called "primary market." This inventory is often subsequently repurchased by ticket resellers (commonly referred to as "brokers") from this primary market, or from the original ticket holder directly, and sold or resold on an exchange serving a secondary market.

The secondary market accounts for roughly USD$10B of the overall market, although accurate numbers are not available, and are rapidly changing as the market evolves. There are multiple exchanges serving the secondary market, and brokers typically list identical tickets across many exchanges. The effect of this is that no single exchange, no single broker, no single venue, no single performer, and indeed no single entity has visibility into the actual sales in the secondary market, for any given ticket or event.

SUMMARY OF THE INVENTION

By way of particular summary of some of the methods, systems and approaches described herein, a group of tickets offered for sale in a ticketing market is called, in the event ticketing industry, a listing. Brokers can broadcast a listing to multiple ticket exchanges. In practice, most brokers broadcast the majority of their listings to all major exchanges. The ticketing market is the combination of all the exchanges.

A market evaluation system comprising: A database configured to store market data; A processor configured by code executing therein to: access market data from the database for a first time period; access market data from the database for a second time period, wherein the second time period is different than the first time period; determine market data subset of each data value that is present in the first time period and not the second time period; assign a comparison score to each member of the market data subset; compare the comparison score for each member of the market data subset to a threshold value, where if the comparison score exceeds the threshold value, the member is classified as an inferred sale; and update a sales database with one or more of the market data classified as an inferred sale.

By way of example, consider a single exchange X which receives the majority of listings from brokers for a set of events E. Then, for E, one can deduce an inferred sale. Here an inferred sale is one in which there is no direct evidence that a sale occurred, but indirect evidence suggests it is likely a sale occurred.

In one implementation of the systems, methods and approaches described herein, it has been recognized that such inferred sales can advantageously be used in lieu of the actual rate of sales across multiple market with similar inventory. This is advantageous for, inter alia, a broker to make decisions regarding the pricing or purchasing of inventory. Furthermore, such an approach represents a solution to a missing data problem that cannot be solved using traditional, routine or conventional approaches. The missing data, when corrected or inferred, allows for automated and dynamic pricing systems to provide faster and more accurate determinations of optimal pricing strategies that rely on past sales data.

In accordance with certain illustrative embodiments of the present invention, a snapshot of the listings offered for sales from an exchange (such as a secondary ticket seller market exchange, herein referred to Exchange X) are captured in two different periods of time. Then, the two snapshots are compared to determine which listings have been removed from that exchange. Each listing is assigned a score based on how likely it is to have sold. For example, a score may be determined based on a number of factors, such as considerations taken into account regarding the price of comparable inventory at the time the listing disappeared. One factor for consideration is the price at which the listing was offered relative to the cheapest price of inventory in the same section of the event arena.

If the determined score exceeds a dynamically generated or pre-determined threshold, then the listing is considered an inferred sale. This process, in one implementation, is repeated periodically, advantageously allowing the system to compile dynamic sales trends over time. If, during this comparison, any listing that had previously been indicated as an inferred sale reappears on the market, it is removed from the list of inferred sales. Optionally, the threshold T can be adjusted to correct for the errant decision to classify that listing as an inferred sale.

BRIEF DESCRIPTION OF THE DRAWINGS

The present invention may be best understood by reference to the following drawings which are meant to be exemplary and not limiting, in which like references are intended to refer to like or corresponding parts and which.

DETAILED DESCRIPTION OF THE PREFERRED EMBODIMENT OF THE INVENTION

Figure 1:
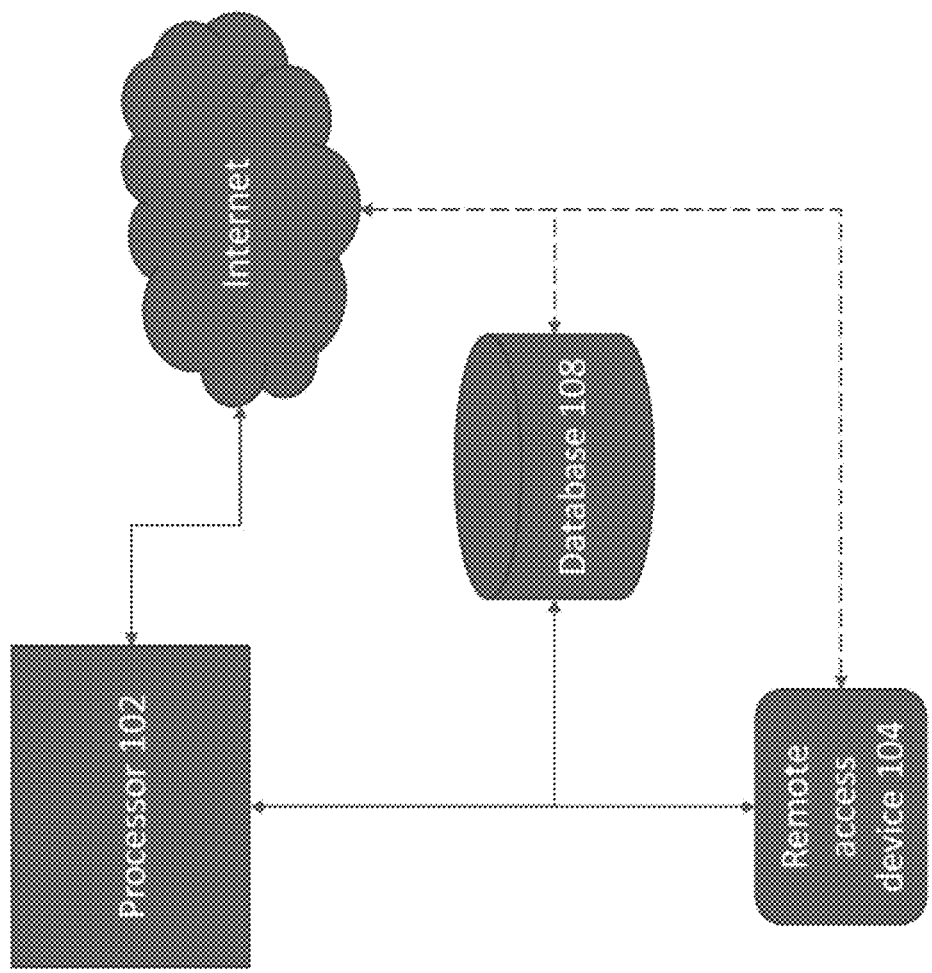
FIG. 1 provides a system configuration to carry out the processes and methods described herein.

The foregoing disclosure is directed to evaluating and generating data regarding inventory sales made through fragmented inventory marketplaces. While the foregoing disclosure provides, as an example, an analysis of secondary reseller market, it will be appreciated by those possessing an ordinary level of skill in the requisite art that other fields of endeavor are improved by the systems, method and apparatus described herein.

By way of overview and introduction, pricing on the secondary ticket market is set by a fragmented community of ticket brokers competing with one another in a market where they are each selling similar inventory. For example, ticket brokers operating in the secondary reseller market will often have similar, but non-identical tickets for sale. Each available seat or access credential to a venue will have its own unique vantage of the event or other characteristics. Brokers often have difficult in determining how to price these non-identical, but comparative tickets on an open market where a customer can select the tickets she wishes to buy on a number of different criterial. In order to determine the preferred price for a ticket, or any comparable inventory on an open market, brokers can utilize a number of different factors. For example, three factors that a broker can use to determine a competitive sale price for a given ticket are the current market listing price of comparable tickets, the availability of comparable tickets, and the actual sale price of comparable tickets that have already sold.

By way of non-limiting example, a broker can utilize the following information this knowledge to determine the optimal sale price for a given item of inventory. Consider a broker who has two tickets for adjoining seats for a baseball game. Comparable inventory, such as for the same game and in the same general area of the venue, are listed on an accessible marketplace at $100. Where this price (e.g. $100 for two tickets in a given location) represents an offering price that is below some nominal rate (i.e. the nominal rate for two tickets for this venue in this location is $150), the broker will need to price substantially below $100 to find where the market will transact with consumers. Alternatively, where the 2 tickets priced at $100 are selling at some nominal rate, a broker can price their own inventory at or slightly below $100 to in order to capture the sale. Where the comparable inventory is selling above some nominal rate (e.g. the nominal rate is $100), the broker can price substantially above $100, and still transact once cheaper inventory has sold. In fact, the broker may wish to arbitrage the $100 tickets, buying them and re-listing them at a higher price.

The nominal rate appropriate for an event can be derived from the broker's experience, previous data on similar events, or other factors. Assuming the broker is correct on the nominal rate, the broker will have little information about current sales on the secondary market and is unable to optimally price relative to that nominal rate. Thus, the lack of this data causes inefficient transactions to be entered into by the broker and the customer. For example, since there is missing data, the broker does not know if the executed strategy will result in a price that is too high or too low. If a broker prices too high, his tickets will not sell. If a broker prices too low, then the broker's profit margin will be smaller than is possible.

Each inventory market makes the available listings and their corresponding prices available, either through an Application Programming Interface (API), intended to allow computer programmers to access the market data conveniently, or through their public facing website where these listings are offered for sale. In either case, one may naively think that a broker could access this listing data, see listings disappear from the market, and conclude that those listings sold at the offered price. In practice, this is far from true. Brokers often constrain the inventory available on the market for a variety of reasons. For example, some brokers constrain inventory in order to create a sense of urgency in potential buyers. Buyers who see a large supply of available inventory tend to value it less than buyers who see much less supply. Brokers can broadcast and unbroadcast their inventory to the exchange and can set software triggers to broadcast replacement inventory when one of their own listings sells. This unbroadcasting has the effect of removing inventory that is otherwise available, and commonly happens. For instance, during the initial on-sale period demand is high, and brokers will broadcast large portions of their inventory. As the on-sale period cools off, the brokers then unbroadcast the inventory to reduce the apparent supply, and therefore increase the perceived value. These listings disappear from the market but did not sell. In addition, if a consumer visits the exchange and places a listing in their shopping cart, the listing will no longer appear in the market for at least a brief period of time, and that particular listings is often replaced shortly after with a different listing. If the consumer does not purchase the listing, it will be later rebroadcast, days, weeks or even months later. A single listing may disappear from the market dozens of times before it is actually sold, if ever.

For clarity, in the current context, the term broadcasting refers to the action of placing inventory on an exchange from a point-of-sale system. A point-of-sale system refers to software employed by a broker to manage their inventory. The term unbroadcasting refers to removing the inventory from an exchange, but still maintaining the inventory in the point-of-sale. This broadcasting/unbroadcasting mechanism allows a broker to maintain a single list of their inventory within a single piece of software, while simultaneously and separately allowing the broker to manage the availability of that inventory on the market.

As provided in more detail herein, a system, method and apparatus are described that permit the analysis of patterns of inventory that are no longer present in market listing and evaluation of the likelihood that such missing market listings are reflective of a sale of inventory. As used herein, such missing market listing, when determined to be the result of an unrecorded transaction are referred to as inferred sales. Here, referred sales describe a transaction that is inferred, as opposed to known, based on available market data. By comparing snapshots of the market, and computing the likelihood that a listing sold, a subset of disappeared listings can be used to estimate the actual velocity of sales through the market. A broker can use this velocity to determine if the market prices are undervalued or overvalued relative to demand, as indicated above.

Referring now to the drawings, in which like reference numerals refer to like elements, FIG. 1 illustrates a market evaluation, inference and assessment system. Here, one or more computers are configured to execute code (e.g. an evaluation server 102). In a particular implementation, the evaluation server 102 includes one or more suitably configured processors having a memory and configured to execute code stored therein. The evaluation server 102 is configured to access, from one or more local or remote data storage repositories, a collection of stored information material or content. For example, as discussed herein, the evaluation server 102 is configured to access market data and make determinations as to whether the absence of a particular listing is indicative of a sale or some other event.

The evaluation server 102 is configured to access information material and content from a database 108. In another implementation, the evaluation server 102 is configured to access data from one or more databases. For instance, database 108 is a ticket exchange, point of sale database, website, API connected database or other remote data storage device or service. However, it is envisioned that more databases are connectable to the evaluation server 102 such that data sources for a plurality of event ticket exchanges or organizations are accessible.

The evaluation server 102 accesses content through a local area network, intranet, or internet. Such data exchanges can include one or more network interfaces, gateways, firewalls, security servers or other network hardware that permits or enables bidirectional data exchanges between the server 102 and databases 108.

The evaluation server 102 is further configured to generate, upon evaluation of the accessed content, output datasets that are stored to local or remote data stores, such as database 108. Additionally, the evaluation server 102 is configured to transmit or send the generated output datasets to one or more remote computers of processor 104.

The users of the remote access devices 104 are also able to access though the evaluation server 102, the content of the one or more databases, such as database 108 and other data associated with the output dataset or general data accessible or utilized by the evaluation server 102.

As used herein, "processor" or "computer" refers one or more electronic devices (e.g. semiconductor-based microcontrollers) configured with code in the form of software, to execute a given instruction set. For example, the evaluation server 102, database 108 and remote access devices 104, include one or more processing or computing elements executing commercially available or custom operating system, e.g., MICROSOFT WINDOWS, APPLE OSX, UNIX or Linux based operating system implementations. In other implementations, evaluation server 102, database 108 and remote access devices 104 each include custom or nonstandard hardware, firmware or software configurations. For instance, the processor or computer can include one or more of a collection of micro-computing elements, computer-on-chip, field programmable gate arrays, graphical processing units, home entertainment consoles, media players, set-top boxes, prototyping devices or "hobby" computing elements. Such computing elements described are connected, directly or indirectly, to one or more memory storage devices (memories) to form a microcontroller structure. The memory is a persistent or non-persistent storage device that is operative to store an operating system for the processor in addition to one or more of software modules. In accordance with one or more embodiments, the memory comprises one or more volatile and non-volatile memories, such as Read Only Memory ("ROM"), Random Access Memory ("RAM"), Electrically Erasable Programmable Read-Only Memory ("EEPROM"), Phase Change Memory ("PCM"), Single In-line Memory ("SIMM"), Dual In-line Memory ("DIMM") or other memory types. Such memories can be fixed or removable, as is known to those of ordinary skill in the art, such as through the use of removable media cards or modules.

The computer memories may also comprise secondary computer memory, such as magnetic or optical disk drives or flash memory, that provide long term storage of data in a manner similar to the persistent memory device. In one or more embodiments, the memory of the processors (such as evaluation server 102) provides for storage of application programs and data files when needed.

The processors or computers described are configured to execute code written in a standard, custom, proprietary or modified programming language such as a standard set, subset, superset or extended set of JavaScript, PHP, Ruby, Scala, Erlang, C, C++, Objective C, Swift, C#, Java, Assembly, Go, Python, Perl, R, Visual Basic, Lisp, TensorFlow for ML, mClust, or Julia or any other object oriented, functional or other paradigm based programming language.

In one particular implementation, the evaluation server 102 is a server, computing cluster, cloud platform or computing array, configured to directly, or through a communication linkage, communicate and exchange data with the one or more remote access device 104.

As provided in the illustrated implementation, the evaluation server 102 is a computer server configured by code executing therein to accept electronic data queried from one of more remote data storage locations (e.g. database 108) and evaluate the queried or accessed data according to pre-determined or dynamic rules, logic, instructions or algorithms.

As used herein, the evaluation server 102 is configured with one or more remote or local data storage devices that store operating code, as well as user information. The evaluation server 102 is also configured to access remote resources such as third-party vendor information, user data, and communication data from third parties through implementation of code modules.

As the implementation of FIG. 1 illustrates, the evaluation server 102 is used to evaluate the content of the database and, based on evaluation of the content, generate new content or reference to particular content. For example, the content stored in the databases are transformed into visualizations suitable for a lay user to assess or comprehend the interactions between and among the data.

With particular reference to FIG. 1, the database 108 is one or more datastores in communication with at least one processor of the evaluation server 102. The physical structure of the database 108 may be embodied as solid-state memory (e.g., ROM), hard disk drive systems, RAID, disk arrays, storage area networks ("SAN"), network attached storage ("NAS") and/or any other suitable system for storing computer data. In addition, the database 108 may comprise caches, including database caches and/or web caches. Programmatically, the database 108 may comprise flat-file data store, a relational database, an object-oriented database, a hybrid relational-object database, a key-value data store such as HADOOP or MONGODB, in addition to other systems for the structure and retrieval of data that are well known to those of skill in the art. The database 108 includes the necessary hardware and software to enable a processor local to the evaluation server 102 to retrieve and store data within the database 108.

With more particular reference to FIG. 1, the remote access devices 104 are used to exchange data, such as electronic messages, data packages, streams or files, over a network to the evaluation server 102. In one implementation, the remote access device(s) 104 connects to the evaluation server 102 directly, such through an internal local network. Alternatively, remote access devices 104 connect to the evaluation server by first connecting to the Internet (as shown in dashed lines).

As used herein, the remote device 104 is a general or single purpose computing device configured by hardware or software modules to connect to a network and receive data from the evaluation server 102. For example, the remote access device 104 is a personal communication device (smartphone, tablet computer, etc.), configured by one or more code modules to exchange data with the evaluation server 102. Remote access device 104 utilizes wired or wireless communication means, such as, but not limited to CDMA, GSM, Ethernet, Wi-Fi, Bluetooth, USB, serial communication protocols and hardware to connect to one or more access points, exchanges, network nodes or network routers.

In one implementation, remote access devices 104 are portable computing devices such as Apple iPad/iPhones®, Android® devices or other electronic devices executing a commercially available or custom operating system, e.g., MICROSOFT WINDOWS, APPLE OSX, UNIX or Linux based operating system implementations. In other implementations, remote access devices 104 are, or include, custom or non-standard hardware, firmware or software configurations. Here, the remote access devices 104 can communicate with the one or more remote networks using USB, digital input/output pins, eSATA, parallel ports, serial ports, FIREWIRE, Wi-Fi, Bluetooth, or other communication interfaces. In one or more configurations, the remote access devices 104 are also configured, through hardware and software modules, to connect to more remote servers, computers, peripherals or other hardware using standard or custom communication protocols and settings (e.g., TCP/IP, etc.) either through a local or remote network or through the Internet.

Figure 2:
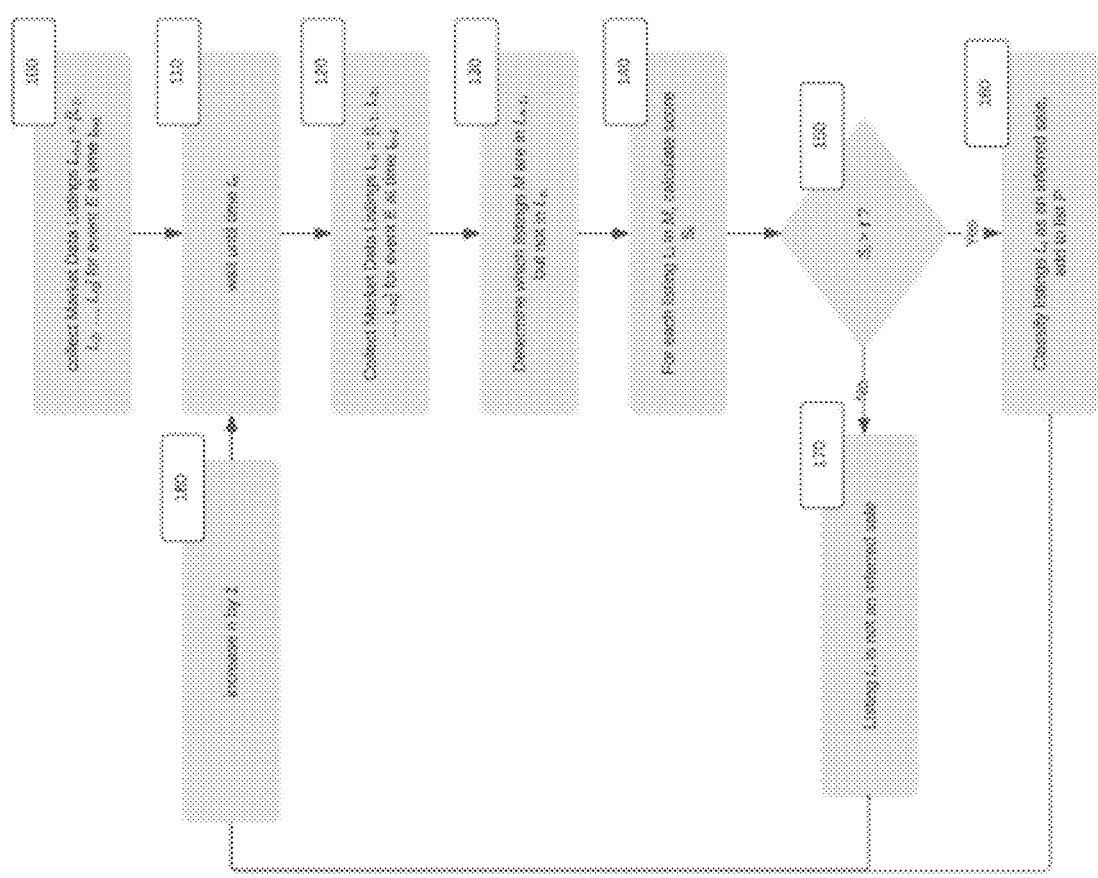
FIG. 2 provides a flowchart of an illustrative method of determining inferred sales of listings from a market of listings, in which listings may be continually added and removed multiple times before selling, if ever.
Figure 4:
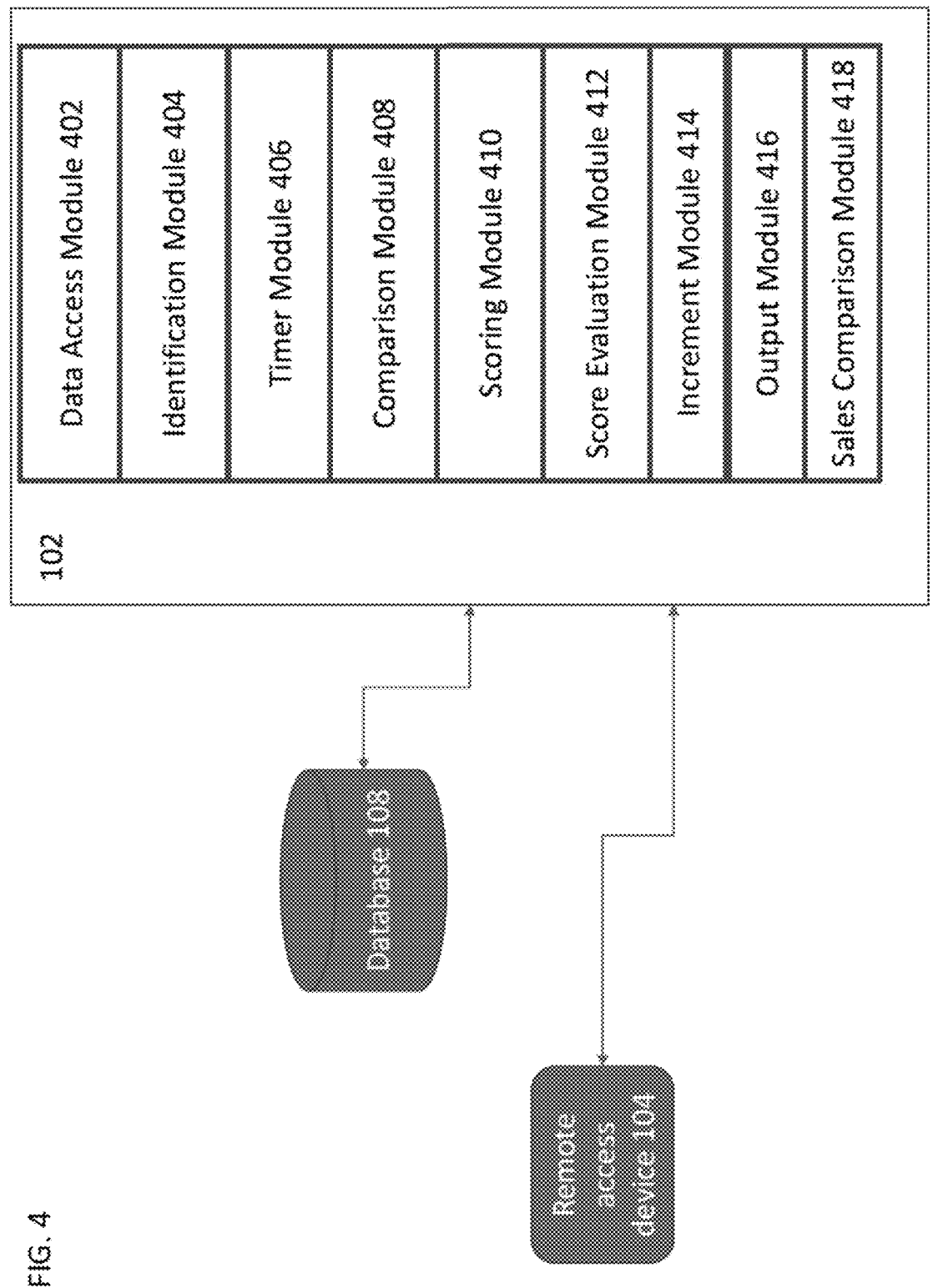
FIG. 4 provides a module diagram detailing particular elements of the approach described herein.

As shown in FIG. 2 and FIG. 4, a block diagram is provided detailing one or more steps carried out by a suitably configured processor of the evaluation server 102. In one or more configurations each of the detailed steps is implemented as one or more modules or submodules of code executing in one or more processors. For example, each of the one or more modules, or submodules, thereof includes algorithms, software, functions, libraries or other instructions that enable the one or more processors of the evaluation system described to access, store and/or process data according to one or more pre-determined routines or processes. By way of further implementation, the flow diagram provided in FIG. 2 details collecting market data, identifying inventory that has been removed from the market and assigning a score to each removal event, and then drawing an inference based upon that score.

By way of particular, and non-limiting example, in a data access step 100, the evaluation server 102 is configured by a market access module 402 to collect market data for an event E. In one arrangement, the evaluation server 102 is configured by the market access module 402, or a submodule thereof, to utilize one or more application programming interfaces (API) to access market data from a data store such as database 108. By way of non-limiting example, the data store can be one or more of, a ticketing exchange, private database, public database, or available data stream. In the provided example, the data accessed using the market access module 402 includes one or more listings ($L_{n-1}$) that can each be identified or tracked over a given time period. For example, each of the listings include one or more unique identifiers, such as but not limited to, a unique ID, a physical location, date of the event, or some other collection of data elements that allows for the identification of a particular listing. In one or more implementations, an identification module 404 configures a processor, such as a processor of the evaluation server 102 to identify a listing according to a collection of two or more available data features associated with a particular listing. For example, a listing might be identified by the number of individual tickets for sale in the listing, the event date, event time, location of the event, name of the event, seat location, or additional services provided with the event ticket (i.e., free parking etc.). It will be appreciated that the identification module 404 configures the processor to identify listings that are available at a given time from a data store. For instance, each listing identified by the identification module 404 is a listing present in the market data at a particular time. By way of particular example, the time used to evaluate and identify a collection of listings if referred to herein as time $t_{n-1}$ and a collection of N listings can be referred to as $L_{n-1}=[L_1, L_2, \ldots, L_N]$, where N≥0.

As shown with respect to time duration step 110, a processor, such as a processor of the evaluation server 102, is configured to evaluate the passage of time. For instance, a timer module 406 or a submodule thereof, allows the processor to wait a predetermined period of time before progressing to the next data access step. In one arrangement, the timer module 406 configures one or more processors to wait for five (5) minutes before continuing to implement the next set of instructions related to the process described herein. In another arrangement, the timer module configures the evaluation server 102 to wait for 30 minutes. In a particular implementation, a user supplied data flag allows the timer module to be set for between 1 minute and 60 minutes. In a particular implementation, the timer module is configured to wait for 1, 2, 3, 4, 10, 15, 20, or 30 minutes. By way of ease of explanation, in the forgoing implementation, the timer module is configured to allow for 10 minutes to elapse.

In an alternative implementation, the timer module 406 receives a duration value from the processor. For example, in one or more implementations, a predictive model is used to generate one or more output values based on a training set of data and is able to correlate the input data to output data. In one particular implementation, a training set of data is provided that includes a collection of prior identified listings of tickets at a first period of time and the collection and the amount of time it took for those listing to become completed sales transactions. For example, the training set of data includes all of the identification features of the listings (location, price, number of tickets) and the time it took for each of those listings to become completed transactions. For example, the training set is constructed so as to allow a neural network or other machine learning agent to evaluate the listing and correlate the features of the listing with the amount of time taken to complete or achieve a completed transaction.

Using this training data, a predictive model can be configured to correlate the duration between a first listing and a subsequent transaction that is likely to be useful in determination of inferred sales. For instance, given this training set, the predictive model is then configured to generate a duration value that indicates the most useful duration of time between the first listing and a subsequent listing for inferring if the transaction is actually completed.

Thus, in one or more submodules of the timer module 406, the listing data obtained in step 100 by market access module 402 is provided to the predictive model. The predicative model is configured, based on the pre-trained model data provided, to generate a likely duration value for the type of listing data provided. For example, given the identifiers associated with a particular listing, and/or with event E itself, such a trained model is configured to output a value of when the subsequent collection of data should be gathered so as to optimize the need to access the transaction feed. Such an approach minimizes the amount of usage necessary of the market feed. It will be appreciated that some market feed data sources have limits on the number of times they can be accessed in a given time period. Such optimization of when to access the subsequent transaction dataset allows for more conservative use of the available resources.

Turning now to data update step 120, the market access module 402 configures the processor to access listing data for the event accessed in data access step 100. For example, after the pre-determined duration provided by the timer module 406 in the time duration step 110, a processor of the evaluation server 102 is configured by the market access module 402 to access the listings associated with the event E. As shown with respect to FIG. 2, data collection in the data update step 120 is grouped in to a collection of one of more listings and defined as $L_n=[L_q, L_r, \ldots, L_K]$, where $K \geq 0$. In one or more implementations, both the data accessed in the data access step 100 and the data update step 120 are stored in one or more data storage locations, such as the database 108 for further analysis and processing.

As shown in comparison step 130, a processor, such as a processor of the evaluation server 102, is configured by a comparison module 408 to compare the data obtained in data access step 100 and data update step 120 (i.e. $L_n$ and $L_{n-1}$). In one or more implementations, the comparison module 408 is configured to evaluate each entry in the original data set and compare that entry to each entry in the updated data set. It will be appreciated that the updated data set obtained in data update step 120 can, in one or more circumstances, have more entries than those present in the original data set. This can be attributed to additional inventory being broadcast into the market data. To account for the dissimilarity of the data sets, the comparison module 408 is configured to identify a unique identifier (such as an ID value) associated with each entry in the original data set and evaluate the updated data set for the ID value. Where an entry cannot be identified in the updated data set, a reference to the missing entry is added to a new data store or data object M, which corresponds to the individual data listings that appear in $L_{n-1}$ and fail to appear in $L_n$.

In one or more particular implementations, the entries in the original data set lack ID values associated therewith. In such a scenario, the comparison module 408, or a submodule thereof, is configured to generate a unique identifier based on the collection of data values associated with the listing. For example, a listing fingerprint can be generated by assigning values for the particular data features of the listing. In another implementation, each section of a venue for the event E can be given a particular value or identifier. Likewise, the number of seats provided in the listing can also be assigned a particular value or identifier. Additionally, the price (or price ranges) for the collection could also be assigned a particular value. For example, and in no way limiting, one or more machine learning modules are used to evaluate and convert the data values of the features of the entry into a suitable metric for comparison between the datasets. For example, a training set of entries from a first time period and a training set of the same entries (as identified by ID number) are provided to a predictive or analytic model (such as a neural network). Here the machine learning algorithms are used to determine the correlation between changes the individual data features of the same entry might occur over time (i.e. slight changes in price due to dynamic pricing strategies or removal of free parking concessions). Using this trained model, the entries can be evaluated to determine the likelihood that they are present in the second or subsequent, updated dataset, based on the correlations implemented by the model.

In one or more further implementations, the comparison module 408 configures the evaluation server 102 to generate fingerprints of the entries using the assigned values. These fingerprints can then be compared to fingerprints for entries of the updated data set to determine if the listing is still present in the updated dataset. In one or more further implementations, the entries identified as not present in the updated dataset are added to the new dataset M. However, in one or more further implementations, each entry added to dataset M that has been evaluated based on a statistical model (such as a fingerprinting algorithm or other machine learning algorithm) is flagged so as to alert subsequent processes that the entry is based on statistical analysis and not a direct comparison between ID values.

Turning now to score generation step 140, a processor of the evaluation server 102 is configured by a scoring module 410 to generate a score $S_i$. In one particular implementation, a score value generated by the processor configured by the scoring module 410 is generated or calculated for each listing $L_i$ within the newly generated set M. Here, the score value corresponds to the likelihood that the entry provided in the set M concerns a successful listing that resulted in a commercial exchange. Here, the scoring module 410 configures a processor the evaluation server 102 to access a scoring model. In one or more implementations, the scoring model is generated by training a machine learning algorithm to evaluate supposed completed transactions. Here a training set is provided to a predictive model where the training set included a collection of listings that have been determined to have resulted in transactions at or near the price provided by the listing. Here, the predictive model is configured to correlate the data features of each listing to generate a correlation or model that, when provided with a new listing, is able to output a value that corresponds to the likelihood that the listing resulted in a transaction as opposed to being removed from the listings in the market place.

In an alternative implementation, the scoring module 410 is configured to evaluate each listing or entry based on one or more data features present in the listings. For example, the scoring module 410 evaluates the likelihood that the evaluated listing resulted in a transaction. For example, the score value is determined based upon, or considering, the price at which the listing was offered relative to the lowest price of inventory in the same section of the event venue. Here, the scoring module 410 is configured to access the stored listing data obtained at the first time period and rank the listings to determine the lowest price offered in the same seating section. In one implementation, a large difference between the price offered by the evaluated listing and the lowest price provided in the listing for the particular section corresponds to a "low" score value. For example, the greater the difference between the lowest price and the transaction under evaluation, the lower the calculated score. For example, the score value is the calculated as the inverse of the difference between difference in price between the transaction and the lowest transaction price in the first dataset. Additional factors, such as amenities, average cost per seat (when there are multiple seats) or other factors can increase or decrease the score value. For example, where the evaluated listing is substantially higher (for example a standard deviation from the mean price for all listings in that section) but includes one or more additional amenities (such as free parking), the s value calculated is adjusted by a small, but non-zero, amount to account for the amenity difference between the price of the listings.

As shown in score evaluation step 150, a processor of the evaluation server 102 is configured by a score evaluation module 412 to compare the score $S_i$ to one or more threshold values. For example, a processor of the evaluation server 102 is configured by the score evaluation module 412 to compare the score values obtained in score generation step 140 to a threshold value T.

As further shown in step 160, where a processor configured by the score evaluation module 412 determines that $S_i>T$, then the listing $L_i$ is classified as an inferred sale and placed into a new list P. Alternatively, as shown in step 170, where a processor of the evaluation server 102 determines that $S_i \leq T$, then a processor of the evaluation server 102 classifies the listing $L_i$ as not an inferred sale.

In one or more implementations, as shown in step 180, a processor of the evaluation server 102 is configured by an increment module 414 to increase the value for n. For example, the value for n is increased by one (1). Upon incremental increase of n, the process returns to time duration step 110, and the process from time duration step 110 to 180 repeats until a termination signal is provided.

In one or more further implementations, the list of inferred sales transactions is output by a processor of the evaluation server 102 configured by an output module 416. Here, the output module 416 transmits the list of inferred sales, without human intervention, to a dynamic or procedural pricing program. For example, a dynamic pricing program, such as one implemented in remote access device 104, receives the output of the inferred sales and determines, based on the price of the listings provided, the sales price of comparable listings. For example, where the inferred sales are within a standard deviation of the average of all of the listing prices for the inferred sales for a given section, a dynamic pricing system is then configured to set the price for new inventory at or below the lowest inferred sale for a given section.

Figure 3:
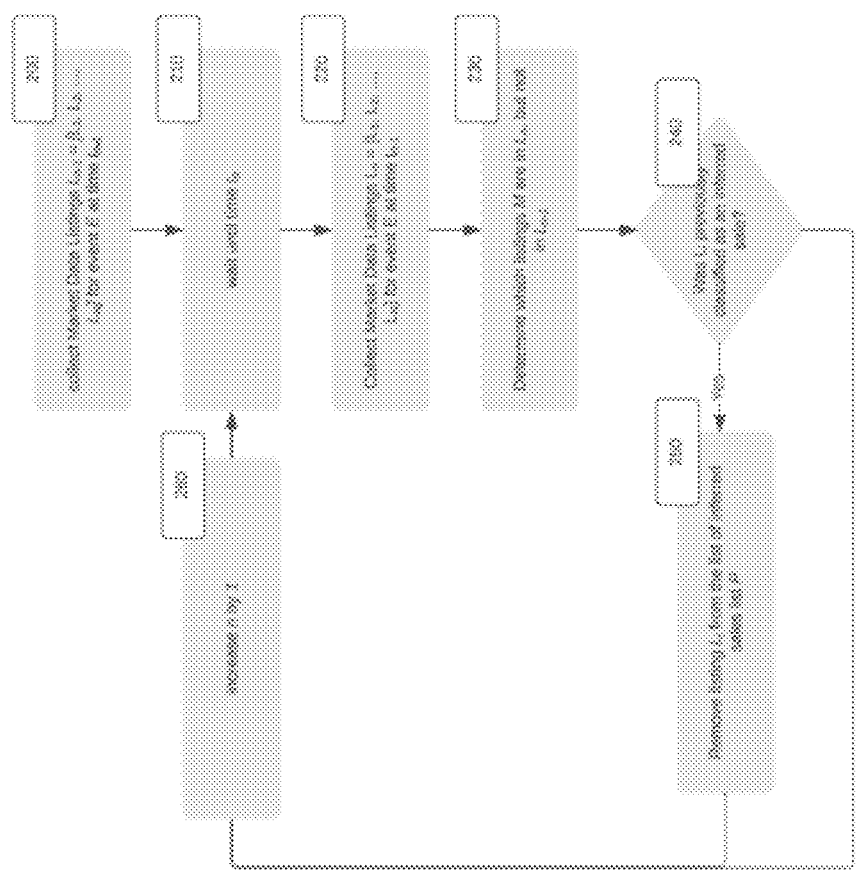
FIG. 3 provides a flowchart of an illustrative method of advantageously determining that a previously label inferred sale is, in fact, not a sale.

Turning now to the implementation of FIG. 3, a process is detailed where the system described in configured to advantageously remove inferred sales that had been incorrectly classified, for example, by the process provided in FIG. 2.

As shown in step 200, a processor of the evaluation server 102 is configured by a data access module (which can be, but is not required, to be the market access module 402 of data access step 100), to collect market data for an event E from a data source. For example, the data source is a ticketing exchange or other accessible data source for event data. In one implementation, the processor of the evaluation server 102 is configured by the market data module to access data that includes zero or more listings $L_{n-1}$ that can each be identified over time either by a unique ID, a physical location, or some other collection of data that can be used to identify a unique listing. Here, the time that the market data is accessed is referred to as time $t_{n-1}$ and the collection of N listings accessed at this time is referred to as $L_{n-1}=[L_1, L_2, \ldots, L_N]$, where $N \geq 0$.

As shown in step 210, time is allowed to pass. For instance, a processor of the evaluation server 102 is configured to evaluate the passage of time. By way of non-limiting example, the timer module 406 or other function allows the processor to wait a predetermined period of time. In one arrangement, the timer module 406 configures one or more processors as described in the time duration step. For example, based on the factors evaluated by the timer module 406, the processor is configured to wait for five (5) minutes before accessing the market data again. In another arrangement, the timer module 406 configures a processor of the evaluation server 102 to wait for 30 minutes. In a particular implementation, a user supplied data flag allows the timer module 406 to be set for between 1 minute and 60 minutes. In a particular implementation, the timer module is configured to wait for 1, 2, 3, 4, 10, 15, 20, or 30 minutes. By way of ease of explanation, in the forgoing implementation, the timer module is configured to allow for 10 minutes to elapse.

As shown in step 220, the collection process performed at step 210 is repeated to get a second group of zero of more listings $L_n=[L_q, L_r, \ldots, L_K]$, where $K \geq 0$.

As shown in step 230, the processor is configured to compare the datasets compiled in steps 210 and 220 (i.e. $L_n$ and $L_{n-1}$) by the comparison module 408. In a particular implementation, the processor is configured by the comparison module 408 to generate a new dataset, M, which corresponds to the individual data listings that appear in the first data set but not in the second dataset.

Turning now to step 240, the processor is configured by a sales comparison module 418 to compare the value for $L_i$ to a previous list of inferred sales P. In one implementation, the inferred sales group is obtained according to step 160 of FIG. 2. For example, the sales comparison module 418 configures a processor of the evaluation server 102 to access the prior generated list of inferred sales for the given event E. In an alternative arrangement, the list of inferred sales is obtained manually, or through a different process.

As shown in step 250, a processor of the evaluation server 102 is configured by a determining module to determine if listing $L_i$ was in P. Where the listing was identified in listing P, then listing $L_i$ is removed from P.

In one or more implementations, as shown in step 260, the processor is configured by an increment module to increase the value for n. For example, the value for n is increased by one (1). Upon incremental increase of n, the process returns to step 210, and the process from step 210 to step 260 repeats until a termination signal is provided.

While this specification contains many specific embodiment details, these should not be construed as limitations on the scope of any embodiment or of what can be claimed, but rather as descriptions of features that can be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features can be described above as acting in certain combinations and even initially claimed as such, one or more features from a claimed combination can in some cases be excised from the combination, and the claimed combination can be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain embodiments, multitasking and parallel processing can be advantageous.

Publications and references to known registered marks representing various systems cited throughout this application are incorporated by reference herein. Citation of any above publications or documents is not intended as an admission that any of the foregoing is pertinent prior art, nor does it constitute any admission as to the contents or date of these publications or documents. All references cited herein are incorporated by reference to the same extent as if each individual publication and references were specifically and individually indicated to be incorporated by reference.

While the invention has been particularly shown and described with reference to a preferred embodiment thereof, it will be understood by those skilled in the art that various changes in form and details may be made therein without departing from the spirit and scope of the invention. As such, the invention is not defined by the discussion that appears above, but rather is defined by the claims that follow, the respective features recited in those claims, and by equivalents of such features.

What is claimed is:

1. A real-time database filtering system comprising:
   at least one database configured to store open transaction data;
   at least one processor configured by code executing therein to:
   access open transaction data from the at least one database for a first time period to generate a first transaction dataset;
   generate a unique identifier for each transaction in the first transaction dataset wherein the unique identifier is based on the collection of data values associated with the transaction;
   generate, using a predictive model, a resource access value, wherein the predictive model is a neural network trained on a training dataset of completed transaction data, where each element of the training dataset includes at least a location and a price transaction characteristic for a given transaction in the training dataset and a time duration value corresponding to the amount of time elapsed to complete the given transaction, wherein the predictive model is configured receive at least a portion of the open transaction data and output the resource access value;
   access open transaction data from the database at a second time period to generate a second transaction dataset, wherein the second time period is determined using the generated resource access value such that accessing the open transaction at the second time period occurs only in intervals of the resource access value;
   generate a unique identifier for each transaction in the second transaction dataset wherein the unique identifier is based on the same data associated with the transaction as used to create the unique identifiers for each transaction in the first transaction dataset;
   determine a subset of the first transaction dataset by identifying each open transaction that is present in the first transaction dataset and not present in the second transaction dataset by comparing the unique identifiers present in the first transaction dataset and the unique identifiers present in the second transaction dataset;
   assign a comparison score to each member of the subset of the first transaction dataset, wherein the comparison score for each entry in the subset of the first transaction dataset is determined, at least by, obtaining the difference between the price of the access credential for the entry in a predetermined area and the lowest price for an access credential in the first transaction database for the same predetermined area wherein the greater the difference obtained the lower the comparison score;
   compare the comparison score for each member of the subset of the first transaction dataset to a threshold value,
   classify, where the comparison score exceeds the threshold value, the member of the transaction data subset as a closed transaction; and
   update a transaction database to include each member of the transaction data subset classified as a closed transaction.

2. The real-time database filtering system of claim 1, wherein each of the transactions concerns the sale of access credentials to an event.

3. The real-time database filtering system of claim 2, wherein the transaction data subset of each data value is determined by:
   Identifying, for each entry in the first transaction database, at least one identifiable data feature that includes a unique identifier, at least a price of the access credentials and a particular area within the event that the access credentials will provide access; and
   comparing, for each entry in the first transaction database, the identifiable data feature, price and particular area to each entry in the second database.

4. The real-time database filtering system of claim 2, wherein the processor is further configured to:
   access open transaction data from the database for a third time period to generate a third transaction dataset, wherein the third time period is different than the second time, and the duration between the first time period and the second time period is the same as the duration between the second time period and the third time period, determine a subset of the second transaction dataset by identifying each open transaction is present in the second transaction dataset and not present in the third transaction dataset;

assign a comparison score to each member of the subset of the second transaction dataset;

compare the comparison score for each member of the subset of the second transaction dataset to the threshold value;

classify, where the comparison score exceeds the threshold value, the member of the second transaction dataset as a closed transaction; and update a transaction database to include each member of the second transaction dataset classified as a closed transaction.

5. The real-time database filtering system of claim 2, wherein the processor is further configured to:

access open transaction data from the database for a third time period for a third transaction database;

access the transaction database with one or more open transaction data classified as a closed transaction sale;

compare each entry in the transaction database to each of the transactions provided in the third transaction database; and where there is a match between an entry in the transaction database and an entry in the third transaction database, remove the matched entry from the transaction database.

6. The real-time database filtering system of claim 1, wherein the second time period occurs after the first time period.

7. The real-time database filtering system of claim 6, wherein the predictive model is a neural network trained to determine the duration of time between the first time period and the second time period and trained by creating a training set of historical transaction data from a database, wherein the training set includes data on the elapsed time between when the open transaction becomes a closed transaction based, and at least the price of the open transaction; and training the neural network using the training set.

8. The real-time database filtering system of claim 7, wherein the time between the first and second time period is the output value of the predictive model.

9. The real-time database filtering system of claim 1, wherein the second time period is derived according to a predictive model.

10. The real-time database filtering system of claim 9, wherein the transaction data from the first time period is provided to the predictive model and a duration value is provided as an output value.

11. The real-time database filtering system of claim 1, further comprising a dynamic transaction pricing server having one or more processors configured to access the update database and at least one transaction in need of pricing and automatically setting the price of a transaction based, at least, upon the inferred closed transaction price of a classified closed transaction.

* * * * *